W. D. LUTZ.
ELECTRIC BRAKE.
APPLICATION FILED MAR. 20, 1912.
1,120,728.
Patented Dec. 15, 1914.
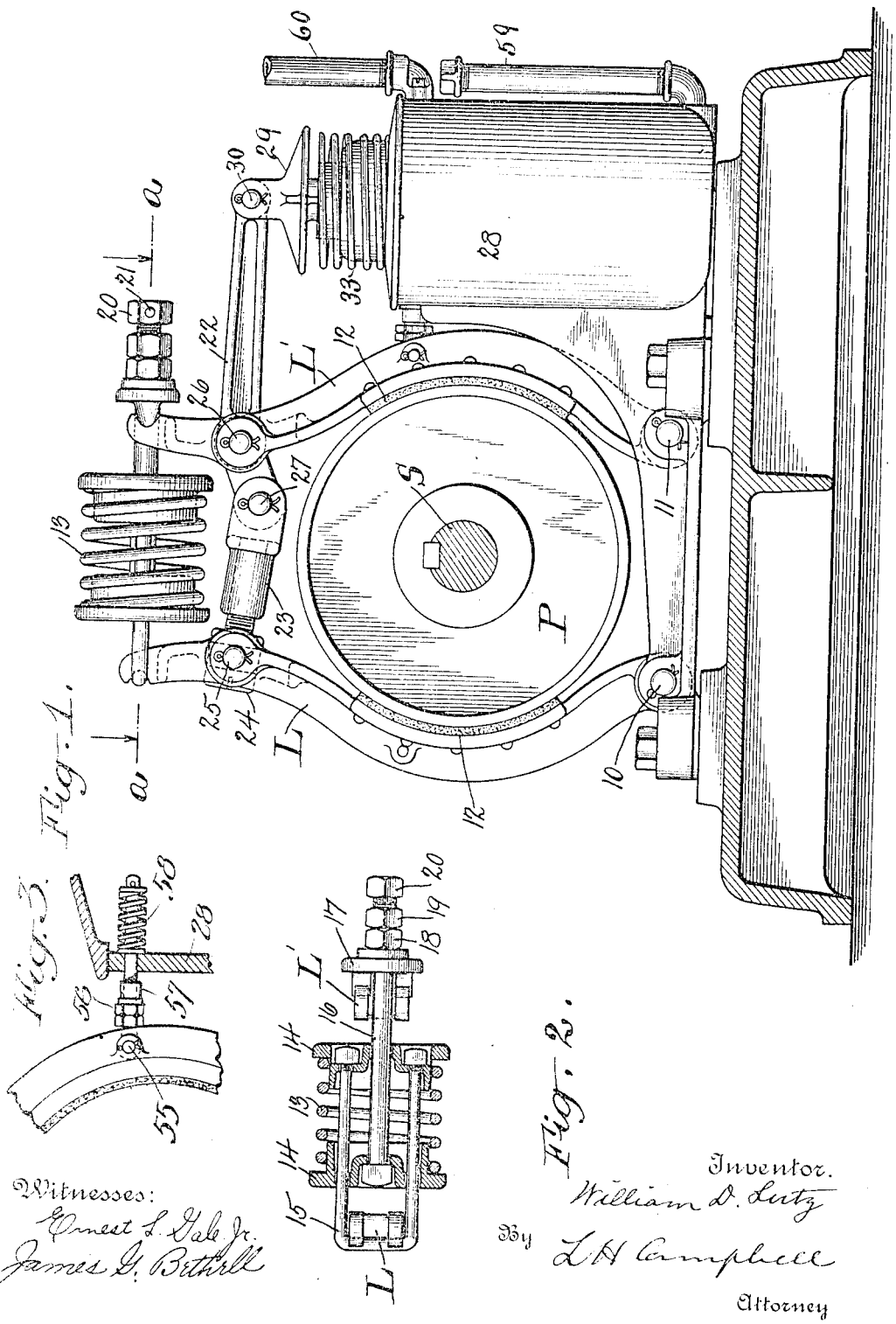
Witnesses:
Ernest S. Gale Jr.
James G. Bethell
Inventor.
William D. Lutz
By L. H. Campbell
Attorney

UNITED STATES PATENT OFFICE.

WILLIAM D. LUTZ, OF ALLENDALE BOROUGH, NEW JERSEY, ASSIGNOR TO OTIS ELEVATOR COMPANY, OF JERSEY CITY, NEW JERSEY, A CORPORATION OF NEW JERSEY.

ELECTRIC BRAKE.

1,120,728.   Specification of Letters Patent.   Patented Dec. 15, 1914.

Application filed March 20, 1912. Serial No. 685,112.

*To all whom it may concern:*

Be it known that I, WILLIAM D. LUTZ, a citizen of the United States, residing in the borough of Allendale, in the county of Bergen and State of New Jersey, have invented a new and useful Improvement in Electric Brakes, of which the following is a specification.

My invention relates to brake apparatus, and more particularly to alternating current electric brakes such as are used with electric elevators.

One of the objects of my invention is the provision of a toggle mechanism for effecting the release of the brake shoes, and means for insuring that both shoes will be moved out of frictional engagement with the brake pulley when the brake is released.

Another object of the invention is the provision of means for preventing the toggle action from becoming locked.

Another object of the invention is the provision of a simple, practical and efficient electrically operated brake mechanism which will operate smoothly and without noise, and in which the lost motion of the various parts is always taken up.

Other objects will appear hereinafter, the novel combinations of elements being pointed out in the annexed claims.

An embodiment of my invention is shown in front elevation in Figure 1 of the drawings; Fig. 2 is a sectional plan view of Fig. 1, the section being taken on the line *a—a;* Fig. 3 is a detail view.

Like reference characters denote similar parts in all the figures.

Referring to the drawings, a brake pulley P is secured upon the shaft S of an elevator or other machine. Brake levers L and L' are pivoted by means of pins 10 and 11, respectively, to the brake frame and are lined with leather or other suitable material 12, 12, which engages the face of the brake pulley when the same is being stopped or at rest. A compression spring 13 is located at the upper end of the brake levers and tends to apply the brake by drawing the brake levers together. The arrangement of this spring is clearly seen in Fig. 2 in which the spring is carried upon and bears against a pair of flanged collars 14, 14. One of these collars is connected by a U-shaped bolt or yoke 15 which passes freely through the other collar and engages the brake lever L. The other collar is connected by a bolt 16 which passes freely through the other collar and a washer 17, and is screw-threaded upon one end to receive adjusting and locking nuts 18 and 19, respectively. A nut 21 is threaded upon the extreme end of the rod 16, and pinned in place and acts as a positive stop for the nuts 18 and 19, should the latter for any reason become loosened and tend to unscrew and fall off the rod. The brake is released by means of a toggle mechanism comprising a lever 22 and link 23 hinged together by a pin 27. The lever 22 is pivoted to the brake lever L' by a pin 26 and is connected at one end to the solenoid core of a brake magnet contained in the magnet casing 28. The toggle link 23 is made in two parts comprising the link 23 and head 24, the latter being threaded into the link and provided with a slot by means of which the head may be screwed into or out of the link, to provide the proper adjustment, and then locked in position by inserting the pin 25 through the head and the lever L. The casing or pot 28 contains an electromagnet operatively connected to the brake lever 22.

In order to insure that both brake levers or shoes shall be moved out of contact with the brake pulley P when the brake is released, I show in Fig. 3 a stud 54 pivoted by a pin 55 to one of the brake levers. This stud extends into the magnet pot and carries upon it a compression spring 58, which tends to draw the brake lever toward the pot and away from the brake pulley. A collar 57 and adjusting nuts 56 are carried on the stud and provide a convenient means for regulating the distance through which the brake lever L' will be moved. The pot cover 34 carries a stiff coil spring 52 which is somewhat shorter in length than the distance between the cover and the flange 31 upon the connecting link 29. This spring serves the double purpose of preventing the toggle action from becoming locked, and of overcoming the residual magnetism of the core and magnet field after the magnet winding is deënergized. Conductors lead to the terminals of the magnet winding in the pot 28 and are incased in a conduit 60 secured to the pot. A riser 59, capped on one end, is connected to the lower end of the pot and furnishes a convenient means for filling and emptying the pot with oil whenever necessary.

The operation of my improved brake apparatus is as follows: Upon closing a circuit to the magnet of the brake, the core is pulled downwardly, thereby effecting a downward pull upon the right hand end of the brake lever 22, through the connecting link 29. This action tends to straighten out the toggle, thereby compressing the brake spring 13, and moving the brake levers L and L' away from the pulley P. In order to insure that both levers will be moved by the brake magnet to releasing position dependency is placed on the spring 58. This spring tends at all times to move the lever L' out of engagement with the brake pulley, but owing to its small power it does not interfere with the brake spring 13 when the brake is applied. In releasing the brake, the spring 58 moves the lever L' away from the brake pulley an amount determined by the clearance between the collar 57 and the side of the pot, which allowance may be regulated by the nuts 56. It will be observed, that due to the position of the brake spring with respect to the other parts, all lost motion in the brake apparatus is always taken up. This feature is of considerable importance, since it enables one to use a magnet of minimum range of action to effect a given result. As before pointed out, the spring 33 acts to prevent the toggle from becoming locked, since it is readily seen that as soon as the brake has been released and the circuit to the brake magnet is interrupted, this spring exerts an upward thrust upon the brake lever 22, thereby rocking the lever about its pivot pin 26. While the brake spring alone would tend to move the toggle away from locking position, such tendency would be of no avail in case the toggle became locked, which might happen were it not for the spring 33, in case the pivot pins 25, 27 and 26 should take up a position in which they all lie in the same horizontal plane. While the toggle will not be moved sufficiently to cause it to lock when properly adjusted, the parts might wear or become out of adjustment to such an extent that the toggle would lock, in which case the spring 33 will be effective to break the lock. Owing to the space between the spring 33 and the flange 31 on the connecting link 29, it is possible to employ a stronger spring than could otherwise be done for the reason that this spring is not compressed until after the magnet core has moved a substantial distance toward operated position, and then, and not until then, will this spring be compressed by the pull of the magnet. As soon as the magnet is deënergized, the spring 33 assists the brake spring 13 in moving the core to its uppermost position, regardless of the opposing action of any residual magnetism which may remain in the magnetic parts of the brake apparatus.

Adjustment of the brake for wear is readily provided at the toggle link head 24. All that is necessary is to remove the pin 25, and by means of a screw driver take up on the head 24 the proper amount, and then replace the pin, the brake spring keeping the brake applied while this adjustment is being made so that it is not necessary to block the pulley P to keep it from turning.

While I have shown a brake apparatus particularly adapted to electric elevators, it may be used to advantage whenever it is desired to employ an electrically operated brake.

Without limiting myself to the precise construction and arrangement of parts herein described and illustrated, what I claim and desire to have protected by Letters Patent of the United States is:—

1. In an electric brake, the combination with a brake pulley, means for applying friction to said brake pulley, a toggle arranged to effect the release of said friction applying means, and a spring for preventing the locking of said toggle.

2. In an electric brake, the combination with a brake pulley, means for applying friction to said pulley, a toggle arranged to effect the release of said friction applying means, and means for adjusting said toggle.

3. The combination with a brake, of a brake pulley, a brake member adapted frictionally to engage said pulley, a spring arranged to move said member into engaging position, means for varying the tension of said spring, and means for limiting the movement of said tension varying means beyond a predetermined point.

4. The combination with a brake, of a brake pulley, a pair of brake shoes, means for moving said shoes out of engagement with said pulley, and additional means for moving one of said shoes out of engaging position.

5. The combination with a brake, of a brake pulley, a pair of brake shoes, means for moving said shoes into braking position, a toggle mechanism for moving said shoes out of braking position, and additional means for moving one of said shoes out of engaging position.

6. The combination with a brake, of a brake pulley, a pair of brake shoes, a spring adapted to apply said shoes to said pulley, a toggle mechanism arranged to release said shoes from said pulley, and means for insuring the release of both of said brake shoes upon the operation of said toggle mechanism.

7. The combination with a brake, of a pair of brake shoes, means for applying and releasing said shoes, and means for limiting the movement of one of said shoes to releasing position.

In testimony whereof, I have signed my name to this specification in the presence of two subscribing witnesses.

WILLIAM D. LUTZ.

Witnesses:
B. N. JONES,
W. O. MOYER.